March 2, 1926.                              1,575,382
B. PASQUARELLI
AUTOMOBILE CURTAIN
Filed July 19, 1924        2 Sheets-Sheet 2
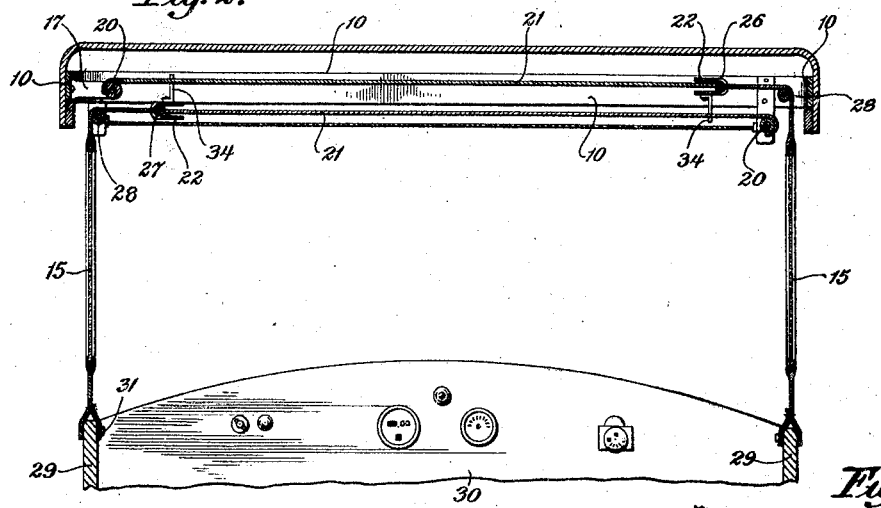
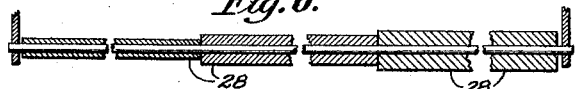
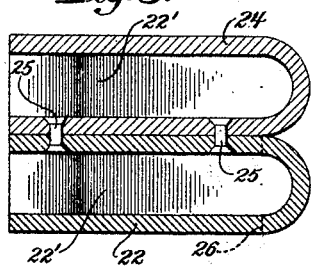
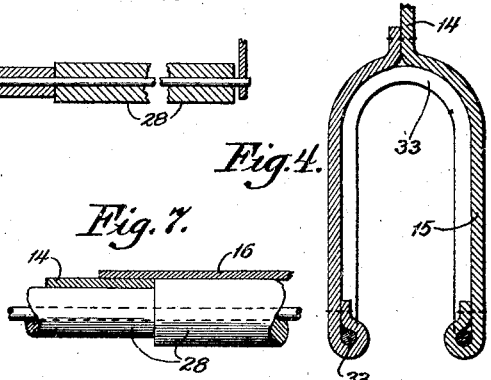
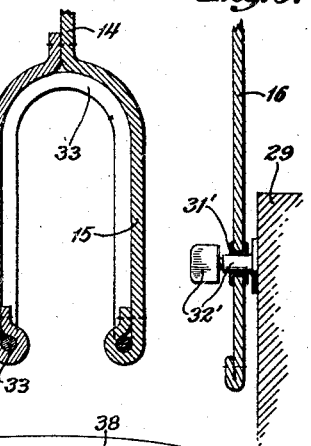
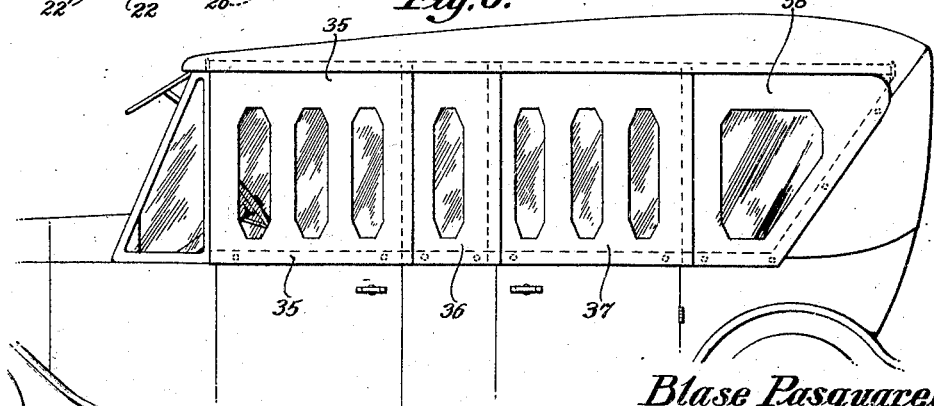
Blase Pasquarelli
INVENTOR
BY Victor J. Evans
ATTORNEY Patented Mar. 2, 1926.

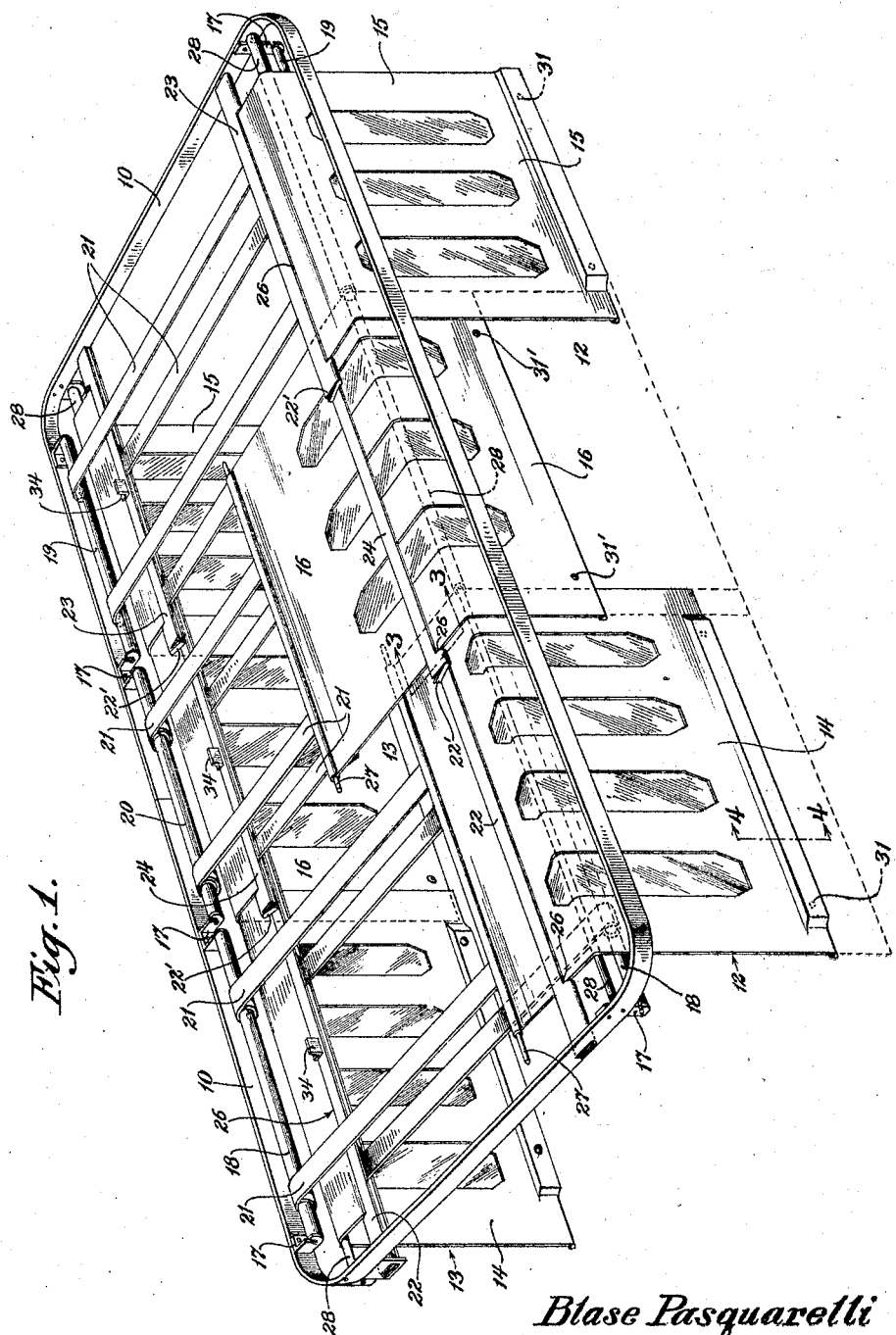

1,575,382

UNITED STATES PATENT OFFICE.

BLASE PASQUARELLI, OF NEW YORK, N. Y.

AUTOMOBILE CURTAIN.

Application filed July 19, 1924. Serial No. 727,051.

*To all whom it may concern:*

Be it known that I, BLASE PASQUARELLI, a citizen of the United States, residing at New York city, in the county of New York and State of New York, have invented new and useful Improvements in Automobile Curtains, of which the following is a specification.

This invention relates to improvements in automobile curtains and more particularly to side or storm curtains which will cooperate with the top in providing a complete enclosure for the occupants of an automobile of the open type.

The principal object of the invention is the provision of side curtains for use in connection with automobiles having a permanent top, and in which top, the curtains are normally concealed, but which may be drawn down in the manner of an ordinary window shade and secured to the sides of the body of the automobile without necessitating the occupants leaving the body of the same.

Another object of the invention resides in the provision of side curtains which will automatically move to a concealed position beneath the automobile top upon releasing the same from their connection with the automobile body.

A further object of the invention is to provide side curtains in which the meeting ends of the same overlap for excluding rain or wind when in closed position.

A still further object is to provide side curtains which will readily permit the entrance or exit of persons into and out of the body of an automobile.

With these and other objects in view, the invention resides in certain novel construction and combination and arrangements of parts, the essential features of which are hereinafter fully described, are particularly pointed out in the appended claims, and are illustrated in the accompanying drawing, in which:—

Figure 1 is a perspective view of my invention showing the curtain in various positions of adjustment.

Figure 2 is a sectional view through the body of an automobile with my invention in use thereon.

Figure 3 is an enlarged detail sectional view on the line 3—3 of Figure 1.

Figure 4 is a similar view on the line 4—4 of Figure 1.

Figure 5 is a detail sectional view showing the manner of connecting the intermediate curtain to the body of an automobile.

Figure 6 is a detail view of one set of the idler rollers.

Figure 7 is a detail sectional view showing means for accommodating the overlapping of the meeting edges of the curtains.

Figure 8 is an elevation showing a slight modification.

Referring more particularly to the drawings and especially to Figures 1 to 7 inclusive, the reference numeral 10 designates a rectangular frame which may represent the usual top frame of an automobile top which frame may be mounted within the top if desired. The frame 10 supports opposite sets of curtains 12 and 13, and each set includes end curtains 14 and 15, and an intermediate curtain 16. The intermediate curtain of each set overlaps the meeting edge of the curtain 14, while the meeting edge of the curtain 15 overlaps the opposite edge of the intermediate curtain as clearly shown in Figure 1. By overlapping the curtains in this manner, it will be seen that rain and wind will be excluded from within the body of the automobile when the curtains are in a drawn position.

Both sets of curtains are mounted within the frame in identically the same manner with the only difference that one set is mounted on a different horizontal plane with respect to the other, so a description of one will suffice for the other. Mounted adjacent the longitudinal side of the frame 10 are spaced brackets 17 which in turn support spring actuated rollers 18, 19 and 20, to which the curtains 14, 15 and 16 are respectively connected by flexible straps 21, one end of each strap being secured to a rod carried by the curtain and which will be presently described and the other end attached to the roller.

Rigidly supported by the frame 10 are stop members 22, 23 and 24 for the respective curtains, the meeting ends of which overlap and are secured together by rivets 25 or the like. The members are U-shaped in cross section and have their right portions slotted as at 26 for the major portion of their lengths and through which slots the curtains pass. The members, however, are not to be restricted to this particular construction as any other suitably shaped member might be provided if desired.

The upper end of each curtain is provided with a rod 27 which extends beyond the side edges of the same for co-action with the closed ends of the respective members 22, 23 and 24 to limit the downward movement of the curtains and fixedly hold said curtains taut. The respective curtains pass over idler rollers 28 which are mounted in the frame 10 in vertical alignment with the side walls 29 of the automobile body 30. The diameter of the rollers 28 are of different diameters to accommodate the overlapping thicknesses of the meeting ends of the curtains, said rollers rolling end to end independently of each other and on a common axis. Briefly, the thickness of the front curtain co-acts with the diameter of the front idler roller to equal the diameter of the roller of the intermediate curtain while the thickness of the intermediate curtain co-acts with the diameter of the intermediate idler roller to equal the diameter of the idler roller of the rear curtain. The ends of the U-shaped members are closed to form tapered guides 22' for the rods 27 in their movement into the respective members.

To hold the curtains down against the side walls 29, I provide the curtains 14 and 15 with fastening elements 31 in the nature of female members for co-action with male members carried by the inner side of the walls 29. In practice, the curtains 14 are adapted to enclose the portion of the automobile, rearward of the rear doors, the curtains 15 are adapted to close the space above the front door and the curtains 16 enclose the space between the front and rear doors.

The curtains 16 are provided with fastening elements 31' similar to those on the curtains 14 and 15, but which co-act with elements 32' on the exterior of the side walls.

Arranged in the V-flap bottom edge of each of the curtains 14 and 15 is a spring clip 33 of inverted V or U-shape in cross section for clamping engagement with the sides of the front and rear doors. The jaws of the clip are sufficiently strong as to hold the curtain in a sealed condition against the doors to prevent rain or wind from entering the interior of the body. The clips terminate short of the overlapping edge so as to only engage the doors.

From the foregoing description, it will be seen that the curtains may be drawn independently of each other and secured to the sides of an automobile, and that the downward movement is limited by the co-operation of the end of the rods 27 with the closed ends of the stop members. The curtains are held in a downward position by the means just described, and upon releasing of the same, the curtains will automatically roll to their normal position within the top. For limiting the rolling of the curtains about the rollers, I provide the stop members with fingers or lugs 34 which project above the horizontal plane of the rods 27 on the members of one set of curtains, and below the horizontal plane of the rods on the members of the other set. The lugs for limiting the movement of one set of curtains are disposed on the members of the other set. Movement of the curtains is therefore limited in one direction by the rods coming in contact with the lugs so as to position the free ends of the curtains in a position adjacent the idler rollers when not in use for permitting the same to be grasped and pulled down against the body of the automobile.

In Figure 8, I have shown a slightly modified form, the construction of which is identical to the preferred form, but in which an additional curtain is incorporated for closing the extreme rear sides, when it is desired to provide a curtain for the rear door which will permit the same to be opened or closed without necessitating the raising of the curtain which encloses the entire rear portion such as shown in the preferred form. In this form, the numeral 35 designates the front curtain, 36 the curtain between the front and rear doors, 37 the curtain covering the space above the rear door, and 38 the extreme rear curtain. The means for winding and securing the curtains 35, 36 and 37 in a downward position is identical to that shown for the intermediate curtain in the preferred form and for this reason a description is not believed necessary.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In combination with the frame of a vehicle top, sets of curtains arranged at opposite sides of said frame, the meeting ends of the curtains of each set overlapping each other, a winding roller for each of said curtains, idler rollers of various diameters to permit of the overlapping of said curtains, members supported by said frame, a slot or channel formed in each of said members through which the respective curtains pass, and means carried by one end of said curtains for co-action with said members for limiting the downward movement of said curtains.

2. In combination with a vehicle of the open type having a top, a frame mounted therein, sets of curtains arranged on opposite sides of said frame for closing the sides of said vehicle between the top and the side walls thereof, each set consisting of end curtains and an intermediate curtain, the meeting ends of said curtains overlapping each other, co-acting means for attaching the free end of said curtains to the side walls of the vehicle body, automatic means for moving said curtains to a concealed position within said top upon the releasing of said co-acting means, and means for limiting the movement of said curtains in either direction, said last means including a rod carried by one end of each curtain for engagement with a member through which the curtains pass when moving to a lowered position and a stop member disposed in the path of movement of said rod when the curtain is moved to a raised position.

3. In combination with the frame of a vehicle top, sets of curtains arranged at opposite sides of said frame, the meeting edges of the curtains of each set overlapping each other, and an idler roller for each of the front, intermediate, and rear curtains, said rollers being of varying diameters, the thickness of the front curtain co-acting with the diameter of the front idler roller to equal the diameter of the roller of the intermediate curtain, to accommodate the overlapping edge of the intermediate curtain, the thickness of the intermediate curtain co-acting with the diameter of the intermediate idler roller to equal the diameter of the idler roller of the rear curtain to accommodate the overlapping edge of the rear curtain.

4. In combination with the frame of a vehicle top, sets of curtains arranged at opposite sides of said frame, the meeting edges of the curtains of each set overlapping each other, an idler roller for each of the front, intermediate, and rear curtains, said rollers being of varying diameters, the thickness of the front curtain co-acting with the diameter of the front idler roller to equal the diameter of the roller of the intermediate curtain, to accommodate the overlapping edge of the intermediate curtain, the thickness of the intermediate curtain co-acting with the diameter of the intermediate idler roller to equal the diameter of the idler roller of the rear curtain, to accommodate the overlapping edge of the rear curtain, a rod carried by one end of each of said curtains, and stop members carried by said frame for co-action with said rods for limiting the movement of said curtains.

5. In combination with the frame of a vehicle top, sets of curtains arranged at opposite sides of said frame, a winding roller for each of said curtains, stop members for co-action by a rod carried by the top end of each curtain for limiting the downward movement of the curtain, and elements disposed in the path of movement of the rods for limiting the winding movement of said curtains about said rollers, the elements for co-action by the rods of one set of curtains being positioned on the stop members of the other set.

6. In a device of the class described, the combination of a plurality of movable curtains, and rollers over which the respective curtains pass, the said rollers being of various diameters and having a common axis to accommodate the overlapping of the meeting edges of said curtains.

In testimony whereof I have affixed my signature.

BLASE PASQUARELLI.